(12) United States Patent
Raghavan et al.

(10) Patent No.: US 7,877,245 B1
(45) Date of Patent: Jan. 25, 2011

(54) GRAPHICAL FUNCTIONS

(75) Inventors: Vijay Raghavan, Framingham, MA (US); Jay Ryan Torgerson, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 12/627,836

(22) Filed: Nov. 30, 2009

Related U.S. Application Data (63) Continuation of application No. 09/855,199, filed on May 14, 2001, now Pat. No. 7,720,656.

(51) Int. Cl.
*G06G 7/48* (2006.01)
*G06F 9/44* (2006.01)

(52) U.S. Cl. .......................................... 703/6; 717/109

(58) Field of Classification Search .................. 717/109; 703/6
See application file for complete search history.

(56) References Cited

U.S. PATENT DOCUMENTS

2002/0083413 A1* 6/2002 Kodosky et al. ............ 717/109

OTHER PUBLICATIONS

Using Real-Time Expert Systems for Control System Prototyping, Karl-Erik Arzen, Oct. 17-20, 1993.*
"Practical Validation of Model Based Code Generation for Automotive Applications", Toeppe et al. 1999 IEEE.*
Årzén, Karl-Erik, "Using Real-Time Expert Systems for Control System Prototyping," *Systems, Man and Cybernetics, International Conference on Systems Engineering in the Service of Humans*, vol. 2:25-30 (1993).
The MathWorks, Inc., Stateflow, For Use with Simulink, User's Guide, Version 2 (1999).
The MathWorks, Inc., Stateflow, For State Diagram Modeling, User's Guide, Version 3.0 (R11) (2000).
Toeppe, S. et al., "Practical Validation of Model Based Code Generation for Automotive Applications," *Proc. 18th AIAA/IEEE/SAE Digital Avionics System Conf.*, (1999).

* cited by examiner

*Primary Examiner*—Kamini S Shah
*Assistant Examiner*—Saif A Alhija
(74) *Attorney, Agent, or Firm*—Nelson Mullins Riley & Scarborough LLP; Kevin J. Canning (57) ABSTRACT

A method, system and computer program product to define and utilize functions graphically is provided which may be used in the simulation of finite state machines. The functions may combine mathematical, logical, non-linear and comparative operations. The graphical elements of the function may be hidden for ease of display of various portions of a model.

24 Claims, 8 Drawing Sheets

GRAPHICAL FUNCTIONS

RELATED APPLICATIONS

This application is a continuation of, and claims priority to, U.S. patent application Ser. No. 09/855,199, entitled "Graphical Functions" and filed on May 14, 2001 now U.S. Pat. No. 7,720,656. The contents of the aforementioned patent application are incorporated herein by reference.

TECHNICAL FIELD

This invention relates to making and using graphical representations of functions that may be invoked in a modeling system for finite state machines.

BACKGROUND

A finite state machine (FSM) is a representation of an event-driven (reactive) system. In an event-driven system, the system makes a transition from one state (mode) to another prescribed state, provided that the condition defining the change is true. For example, a state machine may be used to represent a car's automatic transmission. The transmission has a number of operating states: park, neutral, drive, reverse, and so on. The system makes a transition from one state to another when a driver shifts the stick from one position to another, for example, from park to neutral.

Designers have used truth tables to represent relationships among the inputs, outputs, and states of an FSM. The resulting table describes the logic necessary to control the behavior of the system under study. Another approach to designing event-driven systems is to model the behavior of the system by describing it in terms of transitions among states. The state that is active is determined based on the occurrence of events under certain conditions. State-transition diagrams (STDs) and bubble diagrams are graphical representations based on this approach.

Another method of modeling FSMs is to create a graphical representation (a statechart) of a finite state machine wherein states and transitions form the basic building blocks of the system.

Existing statechart systems for modeling finite state machines permit a user to embed textual definitions of functions in a statechart and invoke those functions in the statechart. In a textually defined function, the procedure performed by the function is defined by code.

BRIEF SUMMARY

In one aspect, the invention provides a method and system using a computer having a graphical user interface and defining a function within a graphical representation of a finite state machine, representing the at least one function graphically; and calling the graphical function in a modeling system. The defining may include the using a function block, which in turn may have a function prototype and also a function flow diagram. In another aspect, the representation of the function uses graphical elements. In yet another aspect, the simulation system offers a means for graphical diagramming.

In still another aspect, the invention may be implemented as a computer program product, stored in a computer readable medium, having instructions to cause a computer to receive user input defining a graphical function and use it in a simulation. In other aspects, the invention may have further instructions to use a function block, a function prototype or a function flow diagram, or combinations thereof. The function flow diagram may be assembled from graphical elements.

In yet another aspect, the invention includes means for simulating a finite state machine. In still another aspect, a user may cause the flow diagram to be hidden. The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Graphical functions allow a user to use a diagram to represent visually a procedure performed by a function in a statechart system. A diagrammatic representation of the function procedure can be easier to understand and modify than a textual representation. In a statechart system which includes built-in state diagram parsing capabilities, the parser may be used to check the diagram for errors. A statechart system's diagram animation and debugging capabilities can be used to step through the graphical function to find errors.

Figure 1:
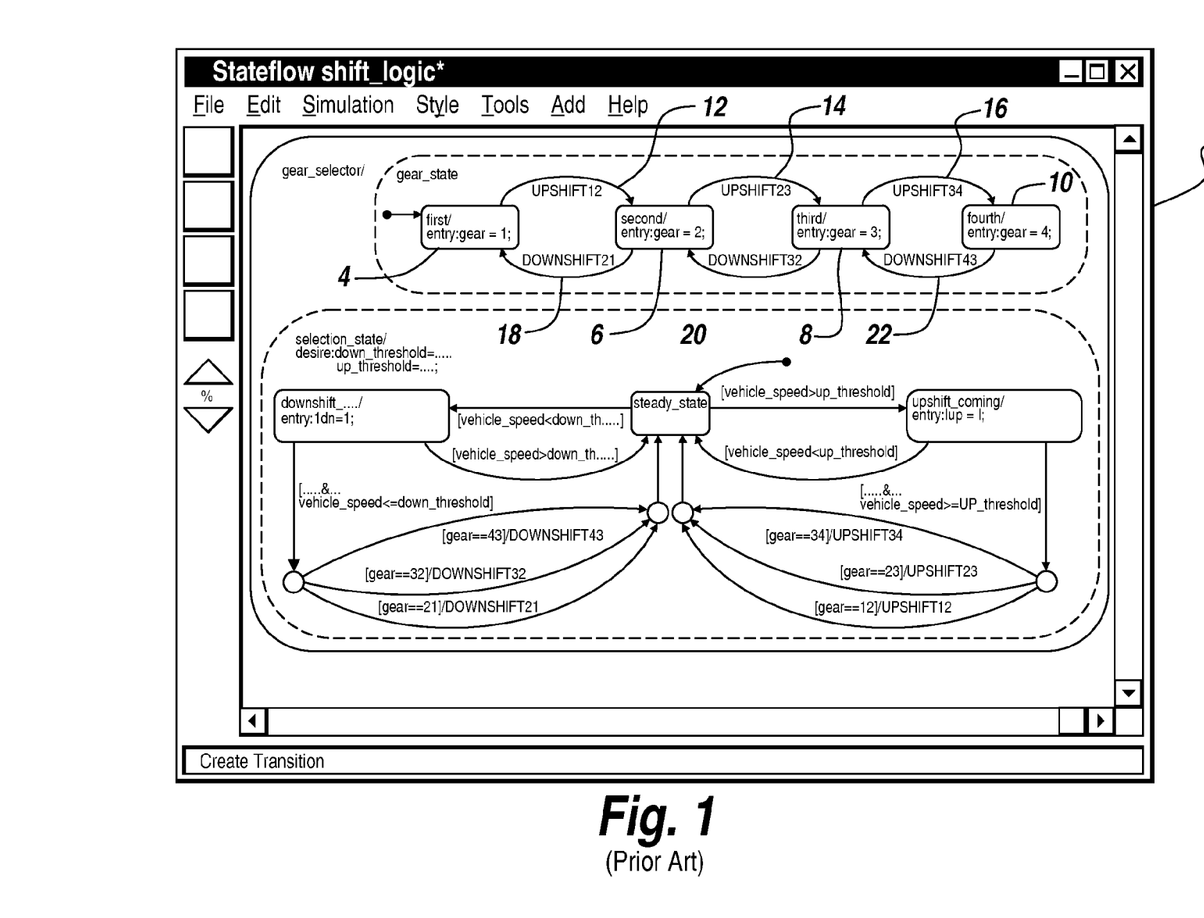
FIG. 1 is a view of prior art showing a statechart modeling system screen.

Referring to FIG. 1, an example of a simple statechart 2 is shown using Stateflow®. States 4, 6, 8 and 10 are shown with transitions 12, 14, 16, 18 20 and 22 modeling the states of an automobile transmission. The following section provides descriptions and definitions of a number of terms used in this application.

A state diagram is a graphical representation of a finite state machine where states and transitions form the basic building blocks of the system.

A state describes a mode of an event-driven system. The activity or inactivity of the states dynamically changes based on events and conditions. Each state has hierarchy. Each state may have a parent state and/or a child state. Each state has a higher hierarchy than its child state but a lower hierarchy than its parent state.

A transition is a graphical object that can link one object to another. One end of a transition is attached to a source object and the other end to a destination object. The source is where the transition begins and the destination is where the transition ends.

A data object/item can store numerical values for reference in a state diagram. Data objects/items are nongraphical objects and are not represented in the figure of the state diagram.

A condition is a Boolean expression specifying that a transition occurs given that the specified expression is true.

A graphical function is a function defined by a flow graph. Graphical functions are similar to textual functions, such as MATLAB and C functions. Like textual functions, graphical functions can accept arguments and return results. Unlike MATLAB and C functions, graphical functions are objects that reside with the state diagram that invokes them. Graphical functions are easier to create, access, and manage than textual functions, whose creation requires external tools and whose definition resides separately from the state diagram.

Figure 2:
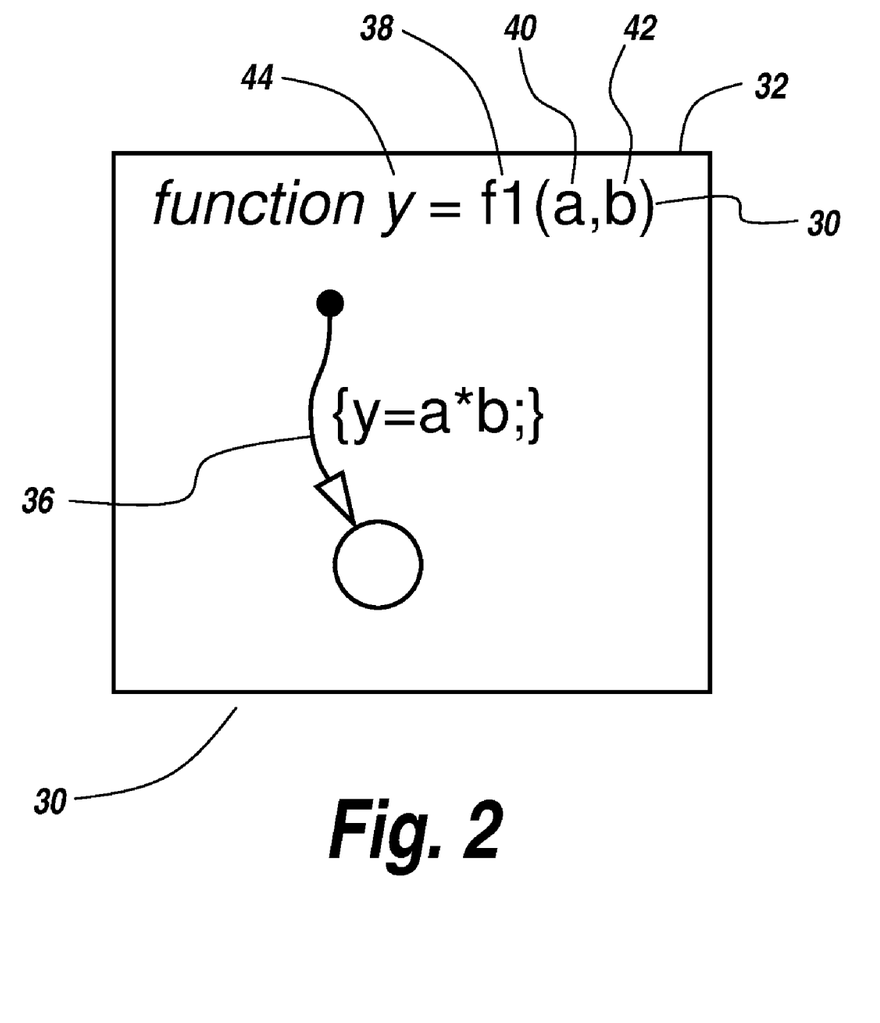
FIG. 2 is a graphical representation of a graphical function.

Referring to FIG. 2, an exemplary implementation of a graphical function 30 is shown as embodied in Stateflow®. The graphical function as shown in this embodiment includes (i) a function block 32; (ii) a function prototype 34; (iii) a function flow diagram 36; (iv) function data (not shown) and (v) scoping rules (not shown). These are more specifically described below.

A graphical function is represented in a state diagram by a function block 32. In the example embodiment, the block 32 is named "function" to distinguish it from other block-like entities, such as states, and contains two elements: a function prototype 34 and a flow diagram 36.

The function prototype 34 specifies the syntax for invoking the function in state and transition actions. In an exemplary implementation described below, it has a function name 38, a parameter list 40 listing arguments passed to the function when it is invoked, and a return parameter 44 representing a list of values returned by the function. Other structures may be used to accomplish a similar result. The number of parameters passed to the function may be any number. In the described embodiment, actions that invoke a graphical function pass arguments 40 and 42 to the function in the same order that they appear in the function's parameter list; however, other argument passing schemes could also be used beneficially.

The function diagram 36 graphically defines the procedure performed by the graphical function. The function diagram 36 can by any type of diagram capable of describing a function (or procedure), including but not confined to data flow diagrams, control flow diagrams, state diagrams, etc. The function diagram can use the function's formal parameters 40 and 42 in actions performed by the flow diagram 36. Argument parameters 40 and 42 are replaced by the actual argument values when the function is invoked. The last value assigned to the return parameter 44 is returned as the function's return value.

Figure 3:
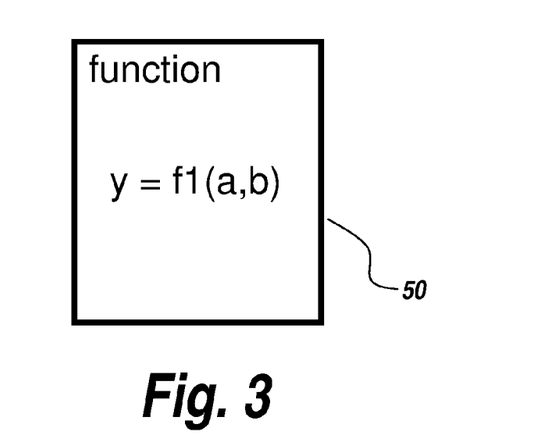
FIG. 3 is a graphical function with the contents hidden.

A diagramming system in a statechart system preferably provides some way for a user to draw the function diagram. A function diagram for a complex function can take up a lot of space. A state diagramming system can save space by allowing a user to hide the function diagram. FIG. 3 shows an example of a function block 50 with its function diagram hidden.

In the described embodiment, graphical functions use variables defined in a diagramming system's data dictionary to store intermediate results of computations. Variables that are defined within a graphical function are private to that function (and to any functions that are defined within that function), and thus need not be uniquely named in the system at large. This prevents one graphical function from overwriting the results of another function. The data dictionary approach allows a user to define special types of data items for use in functions, such as (i) Local: a local data item persists from invocation to invocation. For example, if the item is equal to 1 when the function returns from one invocation, the item will equal 1 the next time the function is invoked;

(ii) Temporary: the system initializes a new copy of a temporary item for each invocation of the function; and (iii) Constant: a constant data item retains its initial value through all invocations of the function.

(iv) Input: a data item that is an argument to the function.

(v) Output: a data item that is a value returned by the function.

A function's scope refers to the set of state diagram elements (states and transitions) that can invoke the function. In the example embodiment, the scope of a function is the scope of the state or statechart wherein it is defined in the statechart. The following exceptions apply:

(i) A statechart can export its functions. The functions exported by a chart can be invoked anywhere in the state machine in which the chart appears, including other charts defined in the state machine.

Figure 9:
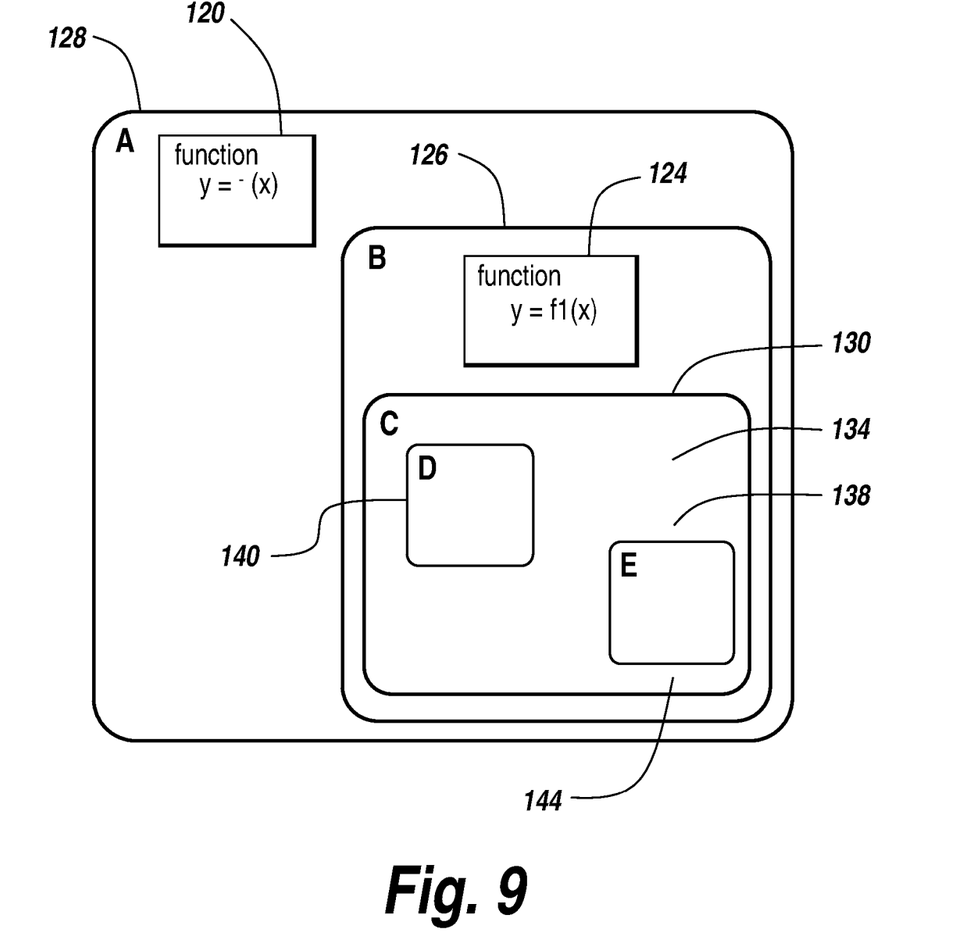
FIG. 9 shows a graphical function that shadows another graphical function.

(ii) A graphical function shadows any functions of the same name defined in ancestors of that graphical function's parent state or chart. In other words, a state or transition that invokes function A will get the version of A defined closest to it in the state diagram hierarchy. For example, FIG. 9 shows a transition condition 134 in state C 130 that invokes a graphical function name f1. The transition condition 134 is a condition of transition 138 to make a transition from state D 140 to state E 144. The chart contains two definitions of f1, one 124 defined in state B 126, the other 120 defined in state A 128. In this example, state B's definition of f1 is the definition that is invoked when transition condition 134 is evaluated in state C 130. This is because state B 126 is a more immediate ancestor of state C 130 than is state A 128.

Figure 4:
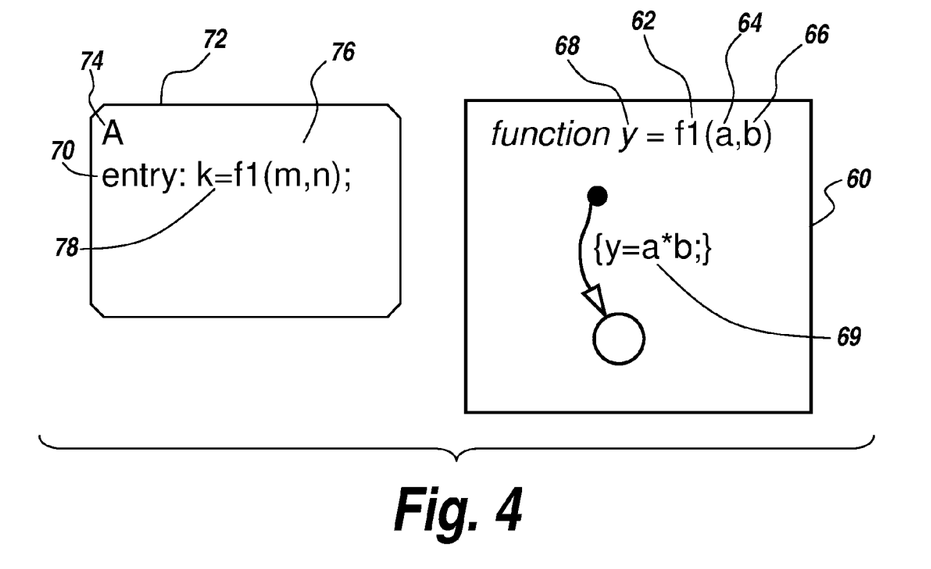
FIG. 4 is a diagram of a graphical function and an invocation of a graphical function.

A state or transition action may invoke a graphical function by replacing the formal parameters of the prototype with actual arguments and assigning the result to a variable. For example, FIG. 4 shows a defined graphical function 60 named f1 62 that multiplies its arguments 64 and 66 according to expression 69 and an invocation (call) 76 of f1 62 in the entry action 70 of a state 72 named A 74. Note that the return parameter 68 in the function prototype of f1 62 need not have the same name as the return parameter in the invocation of the function 78.

Invoking a graphical function generates an implicit CALL event. This event can be used within the graphical function in temporal logic expressions as conditions for executing state or transition actions.

In a typical embodiment in a statechart system, the system's statechart editor will handle development of graphical functions in a chart. The inputs may be user keystrokes, mouse actions, files or other common input methods. The output is normally a statechart containing graphical function definitions and invocations of graphical functions. In the embodiment described, graphical functions use existing charting elements of an existing statechart system, e.g., blocks, labels, and flow diagrams. No special chart editing techniques are required to create graphical functions. A person skilled in the art of computer graphics can readily enhance a chart editor to support creation of graphical functions.

A statechart system's code generation subsystem handles conversion of graphical functions into generated code. The input to the code generation process is one or more charts containing graphical function definitions and invocations. The output may be in a high-level language code (such as C or other high level language) or if preferred, may be in assembly code or other lower level language that realizes the state machine represented by the charts. Graphical functions are usually represented by inline code or by the equivalent functional representations in the target language. For example, if the target language is C, graphical functions are translated into C functions in the generated code.

Code generation from a statechart typically occurs in three phases: parse, optimization, and synthesis. The following describes an exemplary implementation to handle charts containing graphical function definitions. Other implementations are of course possible.

Parse Phase: this phase accepts a chart as input and converts it to an intermediate representation (IR) that facilitates code generation in the final phase. Handling graphical functions in this phase requires adding a function definition parse phase at the beginning of the statechart parse phase. In this initial phase, the parser makes a pass through the statechart searching for graphical function definitions. For each definition, the system converts the graphical function to the intermediate representation for a function. In particular, the graphical function's prototype is converted to an IR function prototype and the graphical function's function graph is converted to IR code. If the function graph is a standard graph type of the charting system, no new programming is required to parse the function graph.

Once the initial graphical function definition parsing phase is completed, the statechart parser parsing proceeds in the usual manner with one exception. Whenever the parser encounters a function invocation in a state or transition, it checks whether the function being invoked is a graphical function. If it is, the parser checks to ensure that the function invocation is complies with applicable syntax rules.a.

Optimization Phase: When generating code, statechart systems typically look for opportunities to optimize the generated code. The performance of code generated from statecharts that use graphical functions can be improved by inlining the code generated for simple functions. Inlining is possible only if the function is never invoked recursively. Thus, the optimization phase must first determine for each graphical function, whether it is directly or indirectly recursive. A function, F, is directly recursive if F invokes itself. F is indirectly recursive, if F is invoked directly or indirectly by any function that F invokes. One method of determining if a graphical function is recursive is to construct the call graph for the function and examine the graph for cycles. If no cycles exist, the function is not recursive and can be inlined.

Even if a function can be inlined, it may not be desirable to inline it. Inlining presents a tradeoff between performance and footprint. Inlining functions increases the performance of the generated code but it also increases its read-only memory (ROM) requirements. Typically code generation systems handle this tradeoff by inlining only functions whose complexity is less than some predefined threshold. For example, one technique is to use the number of generated statements as a measure of complexity. Other well-known complexity measures can be used, such as ROM usage, RAM usage, or speed of execution, depending on the requirements of the system.

Synthesis Phase: The synthesis phase of code generation accepts the intermediate code representation as input and outputs code in a specified target language (e.g., C). Assuming that the IR used by the statechart system includes a scheme for representing functions, no special processing is necessary to handle graphical functions in this phase.

The following describes the declaration and use of graphical functions in an exemplary statechart system.

First determine one or more states in a model where it is desired that the function appear. A function can reside anywhere in a state diagram, either at the top level or within any state or subchart. The location of a function definition determines its scope, that is, the set of states and transitions that can invoke the function. In particular, the scope of a function is the scope of its parent state or chart, with two exceptions:

(i) a chart containing the function exports its graphical functions, in which case the scope of the function is the scope of its parent state machine; and (ii) (ii) a child of the function's parent defines a function of the same name, in which case the function defined in the parent is not visible anywhere in the child or its children. In other words, a function defined in a state or subchart shadows any functions of the same defined in the ancestors of that state or subchart.

Figure 5:
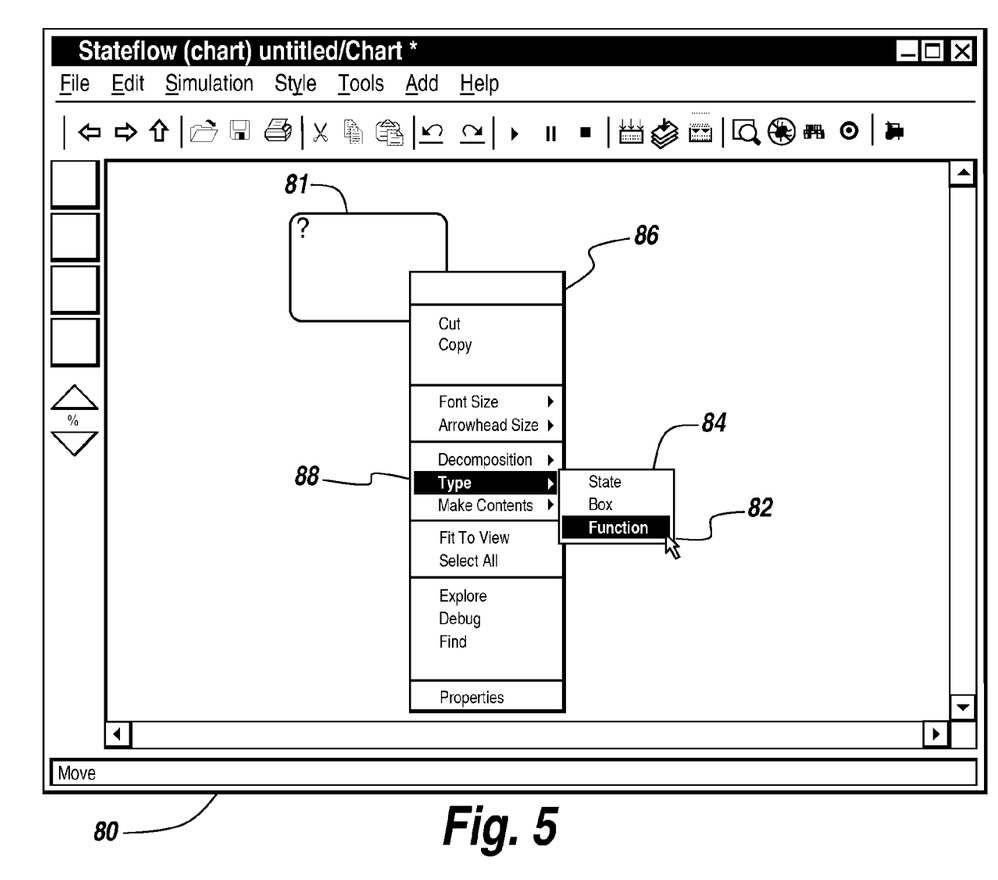
FIG. 5 is a view of an exemplary editing screen used to define a graphical function.

Referring to FIG. 5, an exemplary object definition screen 80 is shown. A blank and undefined object 81 is shown, with a shortcut menu 86. Selecting Function 82 from the Type 88 submenu 84 of the newly created state's 81 shortcut menu 86.

The undefined object is converted from a state to a graphical function.

Figure 6:
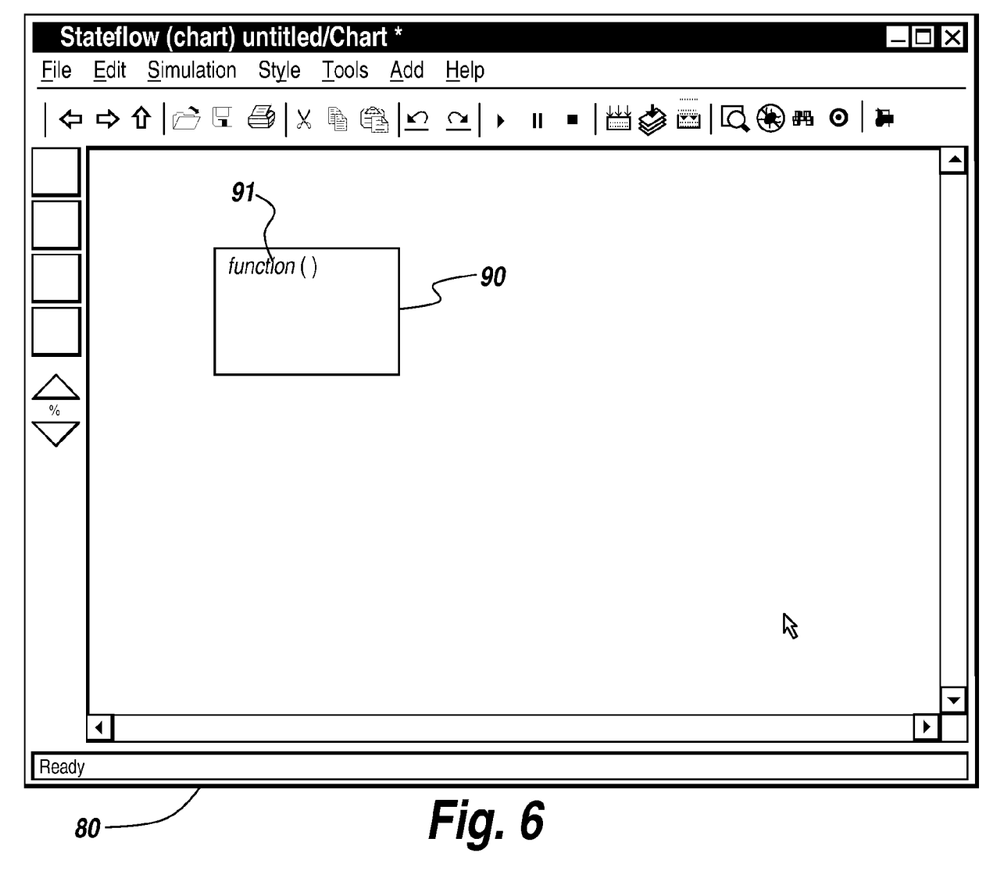
FIG. 6 is a view of an exemplary editing screen showing an empty graphical function shell definition.

Referring to FIG. 6, the selected function 90 appears as an unnamed object with a function label 91.

Figure 7:
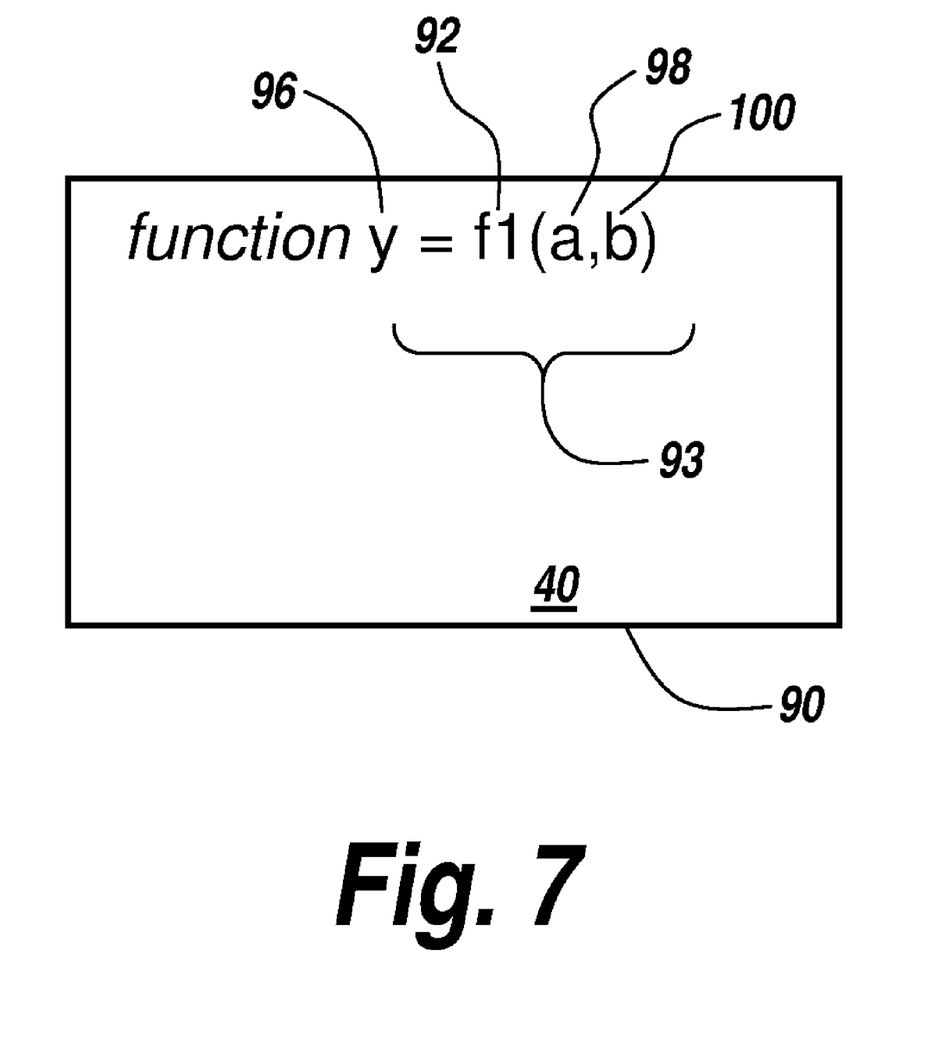
FIG. 7 is a view of a graphical function showing a function prototype.

Referring to FIG. 7, a function label 93 is shown wherein a user has entered a function prototype 92 in the function label 93. The function prototype specifies a name 92 for the function and formal names for its arguments 98, 100 and return value 96. A prototype has the syntax y=f(a.sub.1, a.sub.2, . . . a.sub.n)

where f is the function's name, a.sub.1, a.sub.2, an are formal names for its arguments, and y is the formal name for its return value.

Figure 8:
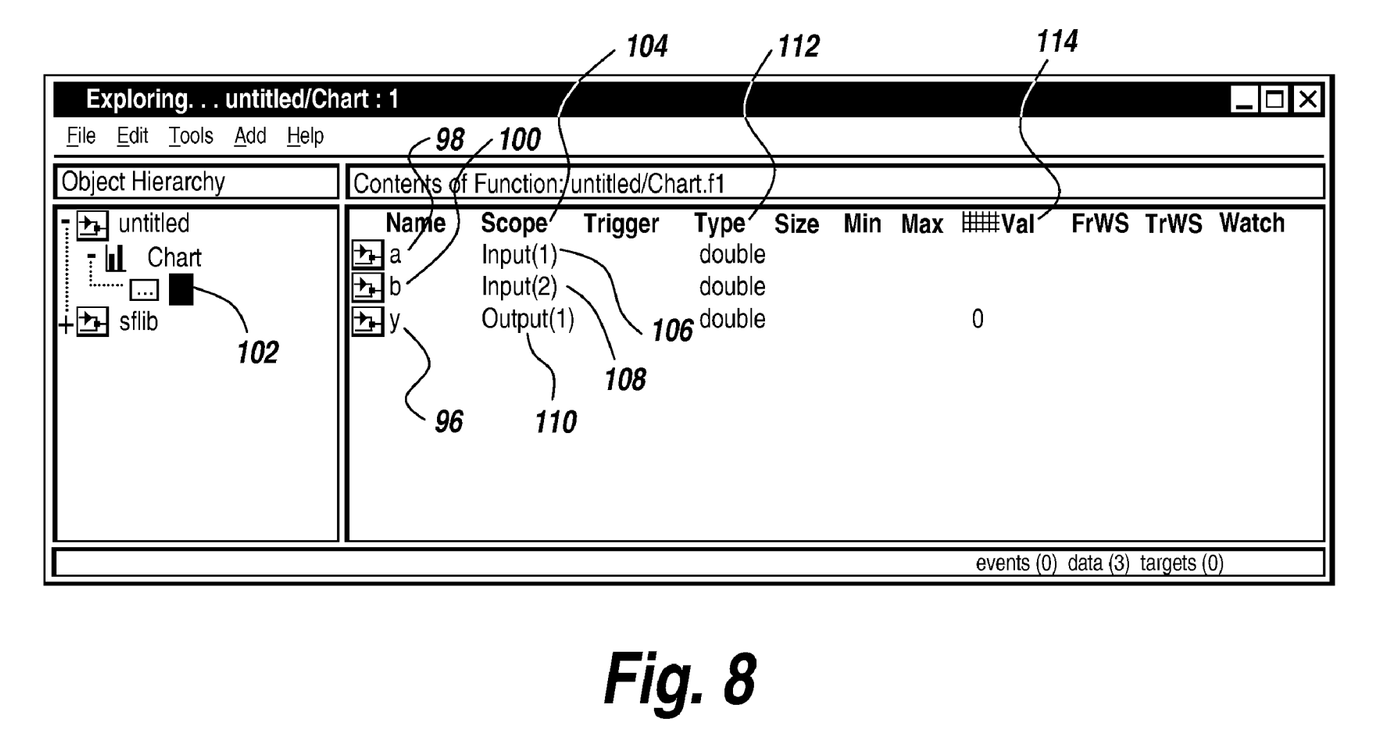
FIG. 8 is a view of an exemplary function argument attributes editing screen.

Referring to FIG. 8, the return value 96 and arguments 98 and 100 declared in the prototype are shown in a screen as data items parented by the function object 102.

The Scope field 104 indicates the role of the corresponding argument or return value. Arguments have scope Input 106, and 108. A return value has scope Output 110. The number that appears in parentheses for the scope of each argument is the order in which the argument appears in the function's prototype. When a graphical function is invoked, arguments are preferably passed to the function in the same order as the function prototype.

The term scope refers to the role (argument or return value) of the data items specified by the function's prototype. The term scope can also refer to a data item's visibility. In this sense, arguments and return values have local scope. They are visible only in the flow diagram that implements the function.

In the shown embodiment, one may use a graphics editor to change the prototype of a graphical function at any time. When done editing the prototype, the system updates the data dictionary to reflect the changes.

If desired, a user may specify other data properties such as data type 112 or initial value 114, etc. of the function's arguments and return values. Other data properties may be defined as desired.

The following restrictions preferably apply to argument and return value properties.

i. Arguments cannot have initial values.

ii. Arguments must have scope Input.

iii. Arguments must have scope Input. Note that the data item property "Input scope" has different meanings in different contexts. In the context of a graphical function, "Input scope" simply means that the data item is a function argument.

iv. Return values must have scope Output. Note that the data property "Output scope" has different meanings in different contexts. In the context of a graphical function, "Output scope" simply means that the data item is a function return value.

v. Arguments and return values cannot be referenced outside the graphical function.

A user defines any additional data items that the function may need to process when it is invoked.

A function must use a qualified name to access a data item that it does not own. The qualified name of a data item is the data item's name prepended with the names of the data item's owner and the ancestors of the owner. For example, suppose that data item x is owned by state B which is the child of state A and that state A is parented by the chart. Then the qualified name of x is A.B.x. A function may use unqualified names to access items that it owns. The items created can have any of local, temporary or constant scopes.

In the example embodiment shown, the flow diagram preferably includes a default transition terminated by a junction. FIG. 2 shows a minimal flow diagram 36 for a graphical function 32 that computes the product of its arguments 40 and 42. The transition may include any function elements that the system is capable of supporting, such as sine, cosine, statistical functions, complex functions and the like.

Any state or transition action that is in the scope of a graphical function can invoke that function. The invocation syntax is the same as that of the function prototype, with actual arguments replacing the formal parameters specified in the prototype. If the data types of the actual and formal argument differ, the exemplary embodiment casts the actual argument to the type of the formal parameter. FIG. 4, discussed above, shows an exemplary embodiment of a state entry action that invokes a function that returns the product of its arguments.

A number of embodiments of the invention have been described. Nevertheless, it will be understood that various modifications may be made without departing from the spirit and scope of the invention. For example, different graphical drawing schemes may be used to define graphical functions, and the scoping rules may be varied. Different data types may be used as well. Accordingly, other embodiments are within the scope of the following claims.

What is claimed is:

1. A medium holding computer executable instruction for performing a method, the medium comprising instructions for:
    receiving a statechart, the statechart comprising at least one state, at least one transition, and at least one graphical function, wherein the graphical function is graphically represented in the representation of the statechart and is distinct from each of the at least one states of the statechart, the graphical function comprising a function prototype that specifies a syntax for invoking the graphical function;
    parsing the statechart into an intermediate representation using a computer, the instructions for parsing the statechart comprising instructions for
    searching the statechart for the graphical function,
    generating an intermediate representation of the graphical function,
    parsing a state or transition of the statechart,
    encountering a function invocation in the state or transition, wherein the graphical function is invoked in the function invocation, and
    checking the function invocation for compliance with the syntax for invoking the graphical function; and
    synthesizing, using the computer, the intermediate representation of the statechart into computer code in a target code language.

2. The medium of claim 1, wherein the graphical function comprises a function diagram that graphically defines a procedure performed by the graphical function.

3. The medium of claim 2, wherein the function diagram is one of the group of a data flow diagram, a control flow diagram, and a state diagram.

4. The medium of claim 1, wherein the statechart is provided in a charting system comprising one or more standard graph types, and the graphical function is associated with a function graph having a type, wherein the function graph type is one of the one or more standard graph types.

5. The medium of claim 1, further comprising instructions for determining if the graphical function is invoked recursively.

6. The medium of claim 5, further comprising instructions for inspecting a call graph of the graphical function to determine if a cycle exists.

7. The medium of claim 1, further comprising instructions for generating an inline intermediate representation of the graphical function if the graphical function is not invoked recursively and a complexity of the graphical function is less than a desired threshold.

8. The medium of claim 7, wherein the desired threshold includes at least one of a number of statements, a ROM usage, a RAM usage, and a speed of execution.

9. A computer-implemented method comprising:
    receiving a statechart, the statechart comprising at least one state, at least one transition, and at least one graphical function, wherein the graphical function is graphically represented in the representation of the statechart and is distinct from each of the at least one states of the statechart, the graphical function comprising a function prototype that specifies a syntax for invoking the graphical function;
    parsing the statechart into an intermediate representation using a computer, parsing the statechart comprising
    searching the statechart for the graphical function,
    generating an intermediate representation of the graphical function,
    parsing a state or transition of the statechart,
    encountering a function invocation in the state or transition, wherein the graphical function is invoked in the function invocation, and
    checking the function invocation for compliance with the syntax for invoking the graphical function; and
    synthesizing, using the computer, the intermediate representation of the statechart into computer code in a target code language.

10. The method of claim 9, wherein the graphical function comprises a function diagram that graphically defines a procedure performed by the graphical function.

11. The method of claim 10, wherein the function diagram is one of the group of a data flow diagram, a control flow diagram, and a state diagram.

12. The method of claim 9, wherein the statechart is provided in a charting system comprising one or more standard graph types, and the graphical function is associated with a function graph having a type, wherein the function graph type is one of the one or more standard graph types.

13. The method of claim 9, further comprising determining if the graphical function is invoked recursively.

14. The method of claim 13, further comprising inspecting a call graph of the graphical function to determine if a cycle exists.

15. The method of claim 9, further comprising generating an inline intermediate representation of the graphical function if the graphical function is not invoked recursively and a complexity of the graphical function is less than a desired threshold.

16. The method of claim 15, wherein the desired threshold includes at least one of a number of statements, a ROM usage, a RAM usage, and a speed of execution.

17. A system for generating computer code, the system comprising:
- a modeling element for receiving a statechart, the statechart comprising at least one state, at least one transition, and at least one graphical function, wherein the graphical function is graphically represented in the representation of the statechart and is distinct from each of the at least one states of the statechart, the graphical function comprising a function prototype that specifies a syntax for invoking the graphical function;
- a parsing element for parsing the statechart into an intermediate representation using a computer, the parsing element configured to
  - search the statechart for the graphical function,
  - generate an intermediate representation of the graphical function,
  - parse a state or transition of the statechart,
  - recognize a function invocation in the state or transition, wherein the graphical function is invoked in the function invocation, and
  - check the function invocation for compliance with the syntax for invoking the graphical function; and
- a synthesizing element for synthesizing, using the computer, the intermediate representation of the statechart into computer code in a target code language.

18. The system of claim 17, wherein the graphical function comprises a function diagram that graphically defines a procedure performed by the graphical function.

19. The system of claim 18, wherein the function diagram is one of the group of a data flow diagram, a control flow diagram, and a state diagram.

20. The system of claim 17, wherein the statechart is provided in a charting system comprising one or more standard graph types, and the graphical function is associated with a function graph having a type, wherein the function graph type is one of the one or more standard graph types.

21. The system of claim 17, wherein the parsing element is further configured to determine if the graphical function is invoked recursively.

22. The system of claim 21, wherein the parsing element is further configured to inspect a call graph of the graphical function to determine if a cycle exists.

23. The system of claim 17, wherein the parsing element is further configured to generate an inline intermediate representation of the graphical function if the graphical function is not invoked recursively and a complexity of the graphical function is less than a desired threshold.

24. The method of claim 23, wherein the desired threshold includes at least one of a number of statements, a ROM usage, a RAM usage, and a speed of execution.

* * * * *